May 26, 1936.  C. W. BECK  2,041,738
STEERING WHEEL
Filed Feb. 6, 1928  3 Sheets-Sheet 1
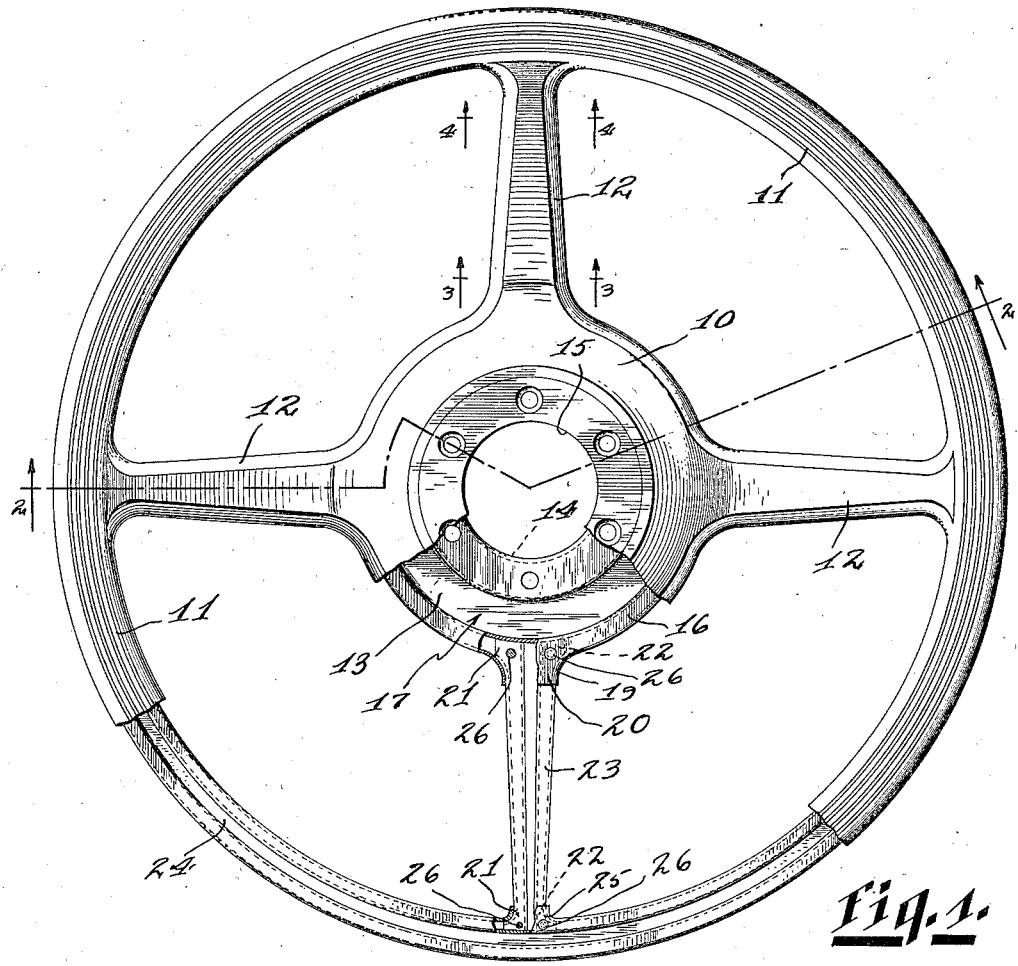
Fig. 1.
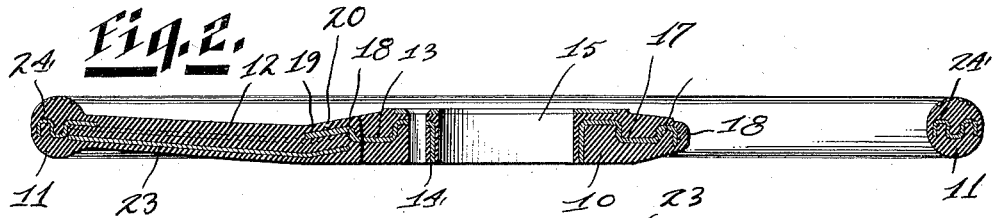
Inventor
Charles W. Beck May 26, 1936.　　　C. W. BECK　　　2,041,738
STEERING WHEEL
Filed Feb. 6, 1928　　　3 Sheets-Sheet 2

Inventor
Charles W. Beck.

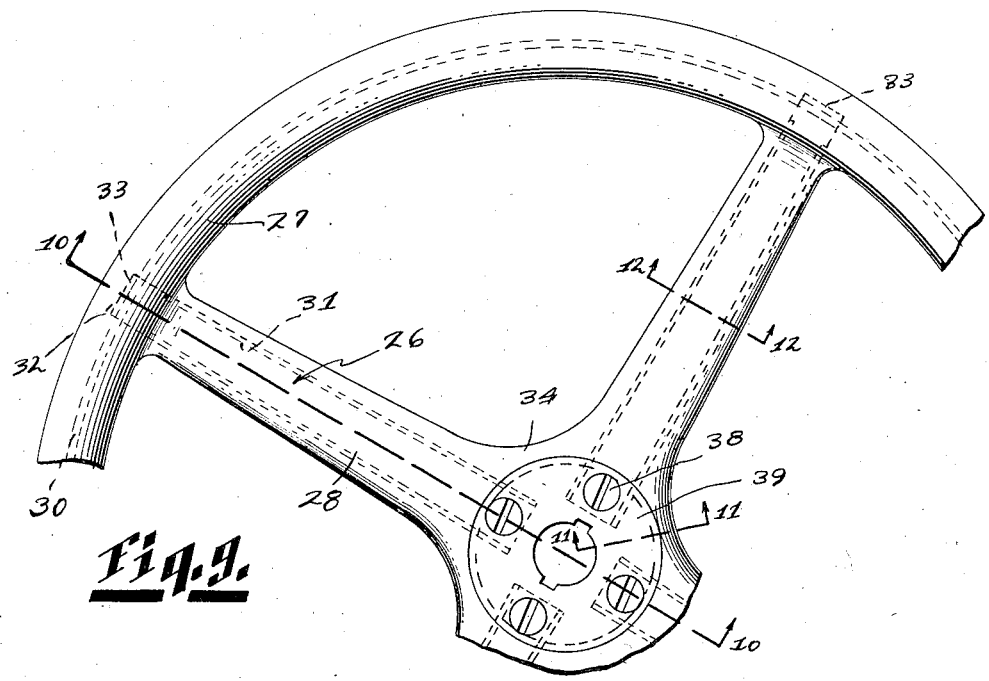
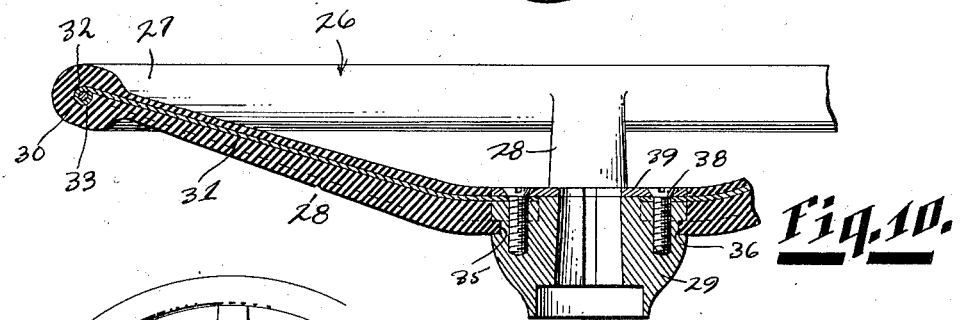
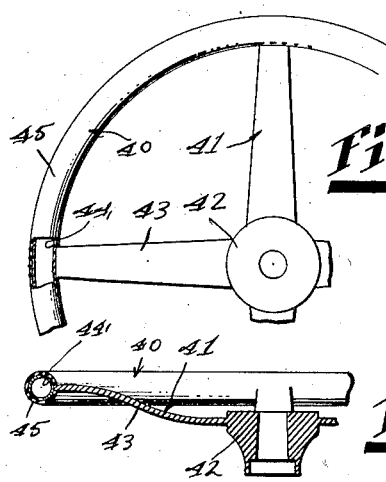
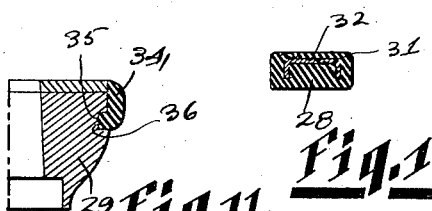

Patented May 26, 1936

2,041,738

UNITED STATES PATENT OFFICE 2,041,738

STEERING WHEEL

Charles W. Beck, Toledo, Ohio, assignor, by mesne assignments, to Nellie M. Beck, Toledo, Ohio Application February 6, 1928, Serial No. 252,251

REISSUED

3 Claims. (Cl. 74—552)

This invention relates to steering wheels for motor vehicles, boats and the like and has particular reference to wheels of the built up type wherein the hub and rim together with the spokes connecting the hub to the rim are formed of metal and are covered with composite material such for example as hard rubber.

The present invention is an improvement over my Patents No. 1,481,530 and 1,395,893 dated Jan. 22, 1924 and November 1, 1921 respectively.

Heretofore in the manufacture of wheels formed of hard rubber serious difficulty has been commonly experienced in constructing a wheel having the necessary strength and durability to resist the shocks and jars without shattering.

It is therefore one of the principal objects of the present invention to eliminate the foregoing difficulties by effectively reinforcing the hub portion and rim of the steering wheel together with the connecting spokes.

A further object of the present invention is to provide a wheel of the above character distinguished by its simplicity of construction and economical manner in which the same may be manufactured.

Other objects and novel features of construction will be made more apparent as this description proceeds especially when considered in connection with the accompanying drawings wherein:

Figure 1 is a plan view of a wheel embodying my invention;

Figure 2 is a sectional view through the wheel taken substantially on the plane indicated by the line 2—2 of Figure 1;

Figure 3 is a cross sectional view taken on the plane indicated by the line 3—3 of Figure 1;

Figure 4 is a view similar to Figure 3 taken on the line 4—4 of Figure 1;

Figure 9 is a view showing another modified construction.

Figure 10 is a sectional view taken on the line 10—10 of Figure 9;

Figure 11 is a sectional view taken on the line 11—11 of Figure 9;

Figure 12 is a sectional view taken on the line 12—12 of Figure 9;

Figure 13 is a fragmentary elevational view partly in section of still another modified construction, and Figure 14 is a sectional view taken on the line 14—14 of Figure 13.

Figure 5:
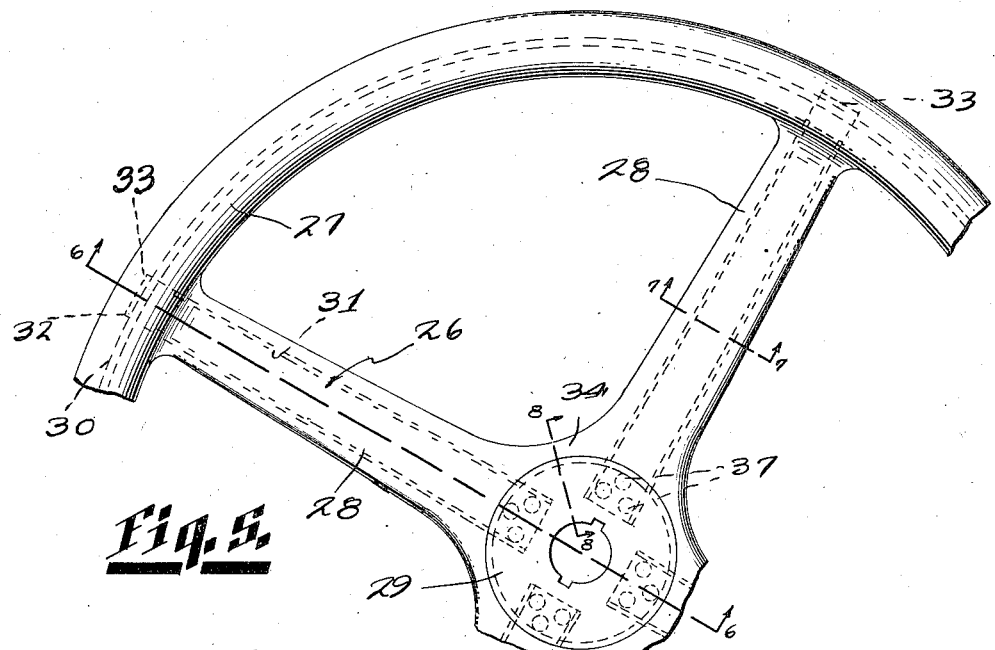
Figure 5 is a view similar to Figure 1 showing a modified form of wheel.
Figure 6:
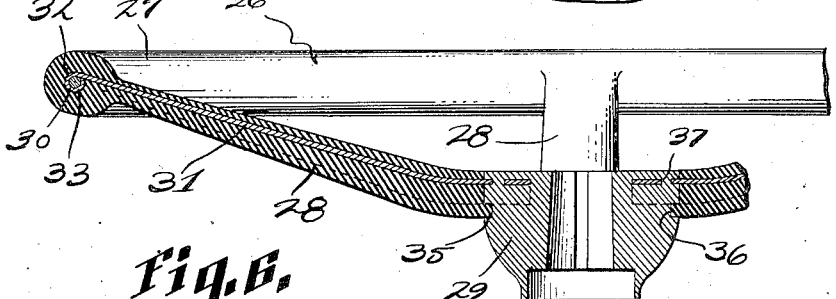
Figure 6 is a sectional view taken on the line 6—6 of Figure 5.
Figure 8:
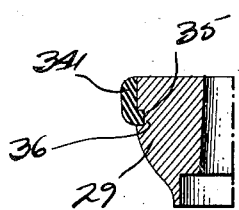
Figure 8 is a sectional view taken on the line 8—8 of Figure 5.
Figure 7:
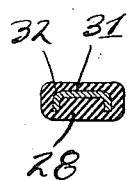
Figure 7 is a sectional view taken on the line 7—7 of Figure 5.

The steering wheel embodying my invention is preferably although not necessarily, formed of a steel frame covered with a suitable plastic material such as hard rubber and comprises the hub portion 10 and rim 11 connected to the hub portion by the radially extending spokes 12. Embedded within the hub portion 10 is an annular reinforcing member 13 having a depending flange 14 at the inner end thereof concentric with the central opening 15 formed in the hub and terminates at the outer end in a downwardly opening channel shaped portion 16. The reinforcing member 13 is preferably formed of steel or any suitable metal having the required strength and is corrugated intermediate the flange 14 and channel portion 16 as illustrated generally by the reference numeral 17. The outer wall 18 of the annular channel-shaped portion 16 is bent outwardly at the points of connection of the spokes with the hub as illustrated at 19 forming substantially lateral flanges 20 which as shown overlap and are secured to the inner end of the crests 21 and 22 of the corrugated reinforcing members 23 embedded within the spokes 12. Extending completely around and embedded within the rim 11 is a third reinforcing member 24. As shown, this member is also formed with a corrugated outline and is provided at the points of connection of the spokes with the rim, with inwardly bent portions 25 which overlap and are secured to the outer ends of the crests 21 and 22. Any suitable means may be utilized for securing the reinforcing members 23 for the spokes to the hub and rim reinforcing members herein shown for the purpose of illustration as rivets 26 extending through aligned apertures formed in the flanges 20 and 25 of the hub reinforcing member and rim reinforcing members respectively, and in the crests 21 and 22 of the reinforcing members 23. As clearly illustrated in the drawings, the reinforcing members 13, 23, and 24 are formed from sheet metal so that the same may be readily stamped to the desired configuration.

In the process of construction the reinforcing members are assembled as indicated above, forming a metallic frame or spider which is placed in a suitable mold, and the desired material such as rubber is placed into the mold embedding the metallic spider, and then properly vulcanized.

In the modified form of the invention illustrated in Figures 5 to 8 inclusive, I have shown a steering wheel 26 having a rim 27 and spokes 28 formed from a composite material such as hard rubber and having a metallic hub 29 rigidly connected to the spokes 28 in a manner to be more fully hereinafter described.

Embedded within the rim 27 is a reinforcing member 30 which may be of any suitable construction herein shown as an annular metallic ring. Extending longitudinally of the spokes 28 are the reinforcing members 31 which as shown, are preferably a steel stamping and corrugated or channel-shaped in cross section. The webs 32 of the channel shaped members project beyond the side walls of the channels at the outer ends thereof and are crimped around the reinforcing member 30 for the rim as indicated at 33, thus providing a rigid reinforcement for the rim and spokes. The inner ends of the spokes 28 are connected together by means of the portion 34 surrounding the hub 29 and having the inwardly extending annular flange 35 engageable in a recess 36 formed in the hub 29. While the inner ends of the reinforcing members 31 are embedded within and are cast integral with the hub 29 and are formed with the openings 37 through which the metal from the hub may flow, thus insuring a rigid connection between the spokes and hub.

In the process of construction, the metallic frame or spider which consists in the hub 29, spoke reinforcing members 31, and rim reinforcing member 30, is placed in a suitable mold and the desired material such as rubber is placed into the mold embedding the reinforcing members 30 and 31 and when vulcanized flows into the annular recess 36 formed in the hub 29. The mold is then permitted to cool and a wheel is formed having a metallic hub and reinforced rubber spokes and rim.

The modified form of the invention illustrated in Figure 9 is substantially the same as the construction featured in Figure 5 with the exception that the inner ends of the spoke reinforcing members are secured to the hub by means of the screws 38 passing through suitable apertures formed in the finishing ring 39 and inner ends of the reinforcing members 31 and threadedly engaging the hub.

In the modified form of the invention illustrated in Figures 13 and 14 the steering wheel 40 comprises a metallic built up frame 41. This frame includes the hub portion 42 radially extending spider arms or spokes 43 and rim 44. The spokes 42 may be secured to the hub and the rim in any suitable manner. For example, the inner ends of the spokes may be cast integral with the hub or may be welded thereto, while the outer ends of the spokes are preferably welded to the rim 44. As shown the rim 44 is preferably tubular in shape and has a covering 45 of any suitable plastic or fibrous material such as rubber or the like.

While in the above described form of the invention the rim only is illustrated as being covered with a plastic material, it will be immediately apparent from the previously described forms of the invention that the spokes 43 may also be covered if desired.

Thus from the foregoing, it will be immediately apparent that the herein described arrangement of reinforcing members offers the possibility of constructing the wheel of a composite material such as hard rubber without the danger of the latter shattering or otherwise becoming unserviceable, and renders possible the production of a commercially satisfactory steering wheel which is simple in construction and comparatively inexpensive to manufacture.

While in describing the present invention, particular stress has been placed upon the fact that the reinforcing members for the spokes are formed separate from the rim and hub reinforcing members, nevertheless it will be immediately apparent to those skilled in this art that the objects and advantages of the invention may be accomplished in a construction wherein the reinforcing members for the spokes are formed integral with the hub and rim reinforcing members and the invention therefore contemplates such an arrangement.

What I claim as my invention is:

1. In a steering wheel, a hub having spokes extending radially therefrom, corrugated reinforcing members extending longitudinally of and embedded within said spokes, and a reinforcement for said hub including a member embedded therein terminating at one end in an annular channel-shaped portion, one wall of said channel being bent outwardly at the points of connection of the spokes with the hub constituting lateral flanges arranged to overlap the reinforcing members embedded within said spokes and are rigidly secured thereto.

2. In a steering wheel, a rim, spokes connecting into said rim, a reinforcement for said spokes including a member embedded within and extending longitudinally of said spokes, and a reinforcement for said rim including a corrugated member extending completely around said rim and provided at spaced points with lateral flanges overlapping and secured to the reinforcing members for said spokes.

3. The combination in a steering wheel having a hub, a rim, and spokes connecting said hub and rim, of a reinforcement for said spokes including members embedded therein, and reinforcing means for the hub and rim including annular corrugated members embedded within said hub and rim and provided at spaced points with lateral projecting flanges overlapping and rigidly secured to the opposite ends of said spoke reinforcing members.

CHARLES W. BECK.